US010919152B1

(12) United States Patent
Kalouche

(10) Patent No.: US 10,919,152 B1
(45) Date of Patent: Feb. 16, 2021

(54) TELEOPERATING OF ROBOTS WITH TASKS BY MAPPING TO HUMAN OPERATOR POSE

(71) Applicant: Nimble Robotics, Inc., San Francisco, CA (US)

(72) Inventor: Simon Kalouche, San Francisco, CA (US)

(73) Assignee: Nimble Robotics, Inc., San Francisco, CA (US)

(*) Notice: Subject to any disclaimer, the term of this patent is extended or adjusted under 35 U.S.C. 154(b) by 333 days.

(21) Appl. No.: 15/954,532

(22) Filed: Apr. 16, 2018

Related U.S. Application Data

(60) Provisional application No. 62/512,179, filed on May 30, 2017.

(51) Int. Cl.
*B25J 9/00* (2006.01)
*B25J 9/16* (2006.01)

(52) U.S. Cl.
CPC ............ *B25J 9/163* (2013.01); *B25J 9/0063* (2013.01); *B25J 9/1697* (2013.01); *Y10S 901/03* (2013.01); *Y10S 901/09* (2013.01)

(58) Field of Classification Search
CPC .............................. B25J 9/0063; B25J 9/1697
See application file for complete search history.

(56) References Cited

U.S. PATENT DOCUMENTS

| | | | |
|---|---|---|---|
| 6,222,465 B1 | 4/2001 | Kumar et al. | |
| 7,269,480 B2 * | 9/2007 | Hashimoto | G06N 3/004 318/568.11 |
| 7,802,193 B1 | 9/2010 | McDonald et al. | |
| 8,095,237 B2 | 1/2012 | Habibi et al. | |
| 9,327,396 B2 * | 5/2016 | Kim | B25J 3/00 |
| 9,579,799 B2 | 2/2017 | Parker | |
| 9,643,314 B2 | 5/2017 | Guerin et al. | |
| 9,684,305 B2 | 6/2017 | Kratz et al. | |
| 2003/0215130 A1 * | 11/2003 | Nakamura | G06T 7/20 382/154 |

(Continued)

OTHER PUBLICATIONS

Alamin, M. et al., "A Vision-Based Teleoperation Method for a Robotic Arm with 4 Degrees of Freedom," 2016 Conference of Basic Sciences and Engineering Studies (SGCAC), pp. 19-23.

(Continued)

*Primary Examiner* — Kira Nguyen
(74) *Attorney, Agent, or Firm* — Lerner, David, Littenberg, Krumholz & Mentlik, LLP

(57) ABSTRACT

A system enables teleoperation of a robot based on a pose of a subject. The system includes an image capturing device and an operator system controller that are remotely located from a robotic system controller and a robot. The image capturing device captures images of the subject. The operator system controller maps a processed version of the captured image to a three-dimensional skeleton model of the subject and generates body pose information of the subject in the captured image. The robotic system controller communicates with the operator system controller over a network. The robotic system controller generates a plurality of kinematic parameters for the robot and causes the robot to take a pose corresponding to the pose of the subject in the captured image.

25 Claims, 6 Drawing Sheets

(56) References Cited

U.S. PATENT DOCUMENTS

| | | | |
|---|---|---|---|
| 2005/0177276 A1* | 8/2005 | Morel | B25J 9/1671 |
| | | | 700/245 |
| 2006/0223637 A1 | 10/2006 | Rosenberg | |
| 2007/0255454 A1* | 11/2007 | Dariush | G06N 3/008 |
| | | | 700/245 |
| 2010/0057255 A1* | 3/2010 | Ra | B25J 5/00 |
| | | | 700/253 |
| 2010/0125799 A1 | 5/2010 | Roberts et al. | |
| 2012/0038739 A1* | 2/2012 | Welch | H04N 13/388 |
| | | | 348/14.01 |
| 2012/0041599 A1 | 2/2012 | Townsend et al. | |
| 2012/0143374 A1* | 6/2012 | Mistry | B62D 57/032 |
| | | | 700/259 |
| 2013/0245824 A1 | 9/2013 | Barajas et al. | |
| 2014/0163736 A1* | 6/2014 | Azizian | A61B 6/4441 |
| | | | 700/259 |
| 2016/0243701 A1 | 8/2016 | Gildert et al. | |
| 2017/0066128 A1 | 3/2017 | Gildert | |
| 2017/0140259 A1 | 5/2017 | Bergstra | |
| 2017/0151667 A1 | 6/2017 | Bergstra et al. | |
| 2017/0173786 A1 | 6/2017 | Gildert et al. | |
| 2017/0255301 A1 | 9/2017 | Norton et al. | |
| 2017/0269607 A1 | 9/2017 | Fulop | |

OTHER PUBLICATIONS

Bassily, D. et al., "Intuitive and Adaptive Robotic Arm Manipulation using the Leap Motion Controller," Conference ISR ROBOTIK, 2014, pp. 78-84.

Hashimoto, S. et al., "TouchMe: An Augmented Reality Based Remote Robot Manipulation," 2011, six pages.

Kofman, J. et al., "Robot-Manipulator Teleoperation by Markerless Vision-Based Hand-Arm Tracking," International Journal of Optomechatronics, Sep. 10, 2007, pp. 331-357.

Kofman, J. et al., "Teleoperation of a Robot Manipulator Using a Vision-Based Human-Robot Interface," IEEE Transactions on Industrial Electronics, vol. 52, No. 5, Oct. 2005, pp. 1206-1219.

Lipton, J. et al., "Baxter's Homunculus: Virtual Reality Spaces for Teleopertion in Manufacturing," Mar. 3, 2017, eight pages.

Tian, N. et al., "A Cloud Robot System Using the Dexterity Network and Berkeley Robotics and Automation as a Service (Brass)," 2017 IEEE International Conference on Robotics and Automation (ICRA), Singapore, May 29, 2017-Jun. 3, 2017, pp. 1615-1622.

Toris, R. et al., "The Robot Management System: A Framework for Conducting Human-Robot Interaction Studies Through Crowdsourcing," Journal of Human-Robot Interaction, vol. 3, No. 2, 2014, pp. 25-49.

Whitney, D. et al., "Comparing Robot Grasping Across Desktop and Virtual Reality with ROS Reality," 2017, 16 pages.

Zhang, T. et al., "Deep Imitation Learning for Complex Manipulation Tasks from Virtual Reality Teleoperation," Oct. 12, 2017, nine pages.

* cited by examiner

TELEOPERATING OF ROBOTS WITH TASKS BY MAPPING TO HUMAN OPERATOR POSE

CROSS REFERENCE TO RELATED APPLICATION

This application claims the benefit of U.S. Provisional Application No. 62/512,179, filed May 30, 2017, which is incorporated by reference in its entirety.

BACKGROUND

The disclosure relates generally to teleoperation of robots and specifically to teleoperation of robots based on a pose of a human operator.

Traditionally, teleoperation of robots having multiple degrees of freedom (DOF) is accomplished using complex controllers that may be specifically designed for a particular robot arm. In some instances, these controllers may be as simple as using a joystick, but more commonly these controllers are complicated devices, such as body worn exoskeletons that map the exoskeleton's joint angles to the robot's joint angles. In both situations, handheld or worn hardware is used to teleoperate the robot. In the case of handheld joysticks or traditional remote controllers, the teleoperation of a high DOF robot is challenging, not intuitive, and slow because of the lack of direct mapping from joysticks and buttons to the many degrees of freedom of the robot. While these controllers provide a relatively cheap method of teleoperating a robot, they require significant training or automation to handle low-level functionality and are typically not time efficient. For example, a robot having two or more legs (a high DOF system) operated in real-time using a controller would require low-level algorithms for balancing the robot to be autonomously handled, while the controller or joystick would be used for high-level commands (e.g., which direction and speed the robot should ambulate in). Similarly, controlling a robot arm using joysticks requires the joystick to map 6 DOF or more into 2 or 3 DOF interfaces of the joystick, which is not intuitive and can lead to slow teleoperating speeds for even simple tasks.

Alternatively, an exoskeleton can be worn to control a robot, which may allow for more intuitive and direct control of a robot arm with a morphology that is similar to the arm of a human operator. This method of teleoperation is easier for the operator to learn and can integrate haptic feedback to allow the operator to feel forces that the robot is sensing when it interacts with its environment. However, exoskeletons are complex systems that are expensive, not easily donned or doffed, not portable or mobile, and typically not accommodating for differences in limb or body size from one operator to another. Another alternative for teleoperation is the use of motion capture systems. However, current motion capture systems rely on either 1) optical systems that require retrofitting a room with an array of calibrated cameras and tagging the operator with reflective markers at body locations of interest for tracking or 2) wearable inertial measurement units (IMUs) that require precise calibration, are susceptible to drifting, and are tedious to don and doff.

SUMMARY

Embodiments relate to teleoperation of a robot of a robotic system based on a pose of an operator. Teleoperation indicates operation of a system or machine at a distance. The system includes an image capturing device and an operator system controller that are remotely located from a robotic system controller and a robot.

In one embodiment, the image capturing device captures an image of a subject (i.e., operator). The operator system controller is coupled to the image capturing device and maps a processed version of the captured image to a three-dimensional skeleton model of the subject. The operator system controller generates body pose information of the subject in the captured image. The body pose information indicates a pose of the subject in the captured image. The robotic system controller communicates with the operator system controller over a network. The robotic system controller generates a plurality of kinematic parameters of a robot by processing the body pose information received from the operator system controller based on a configuration of the robot. The robotic system controller controls one or more actuators of the robot according to the plurality of kinematic parameters, causing the robot to take a pose corresponding to the pose of the subject in the captured image.

Figure 1:
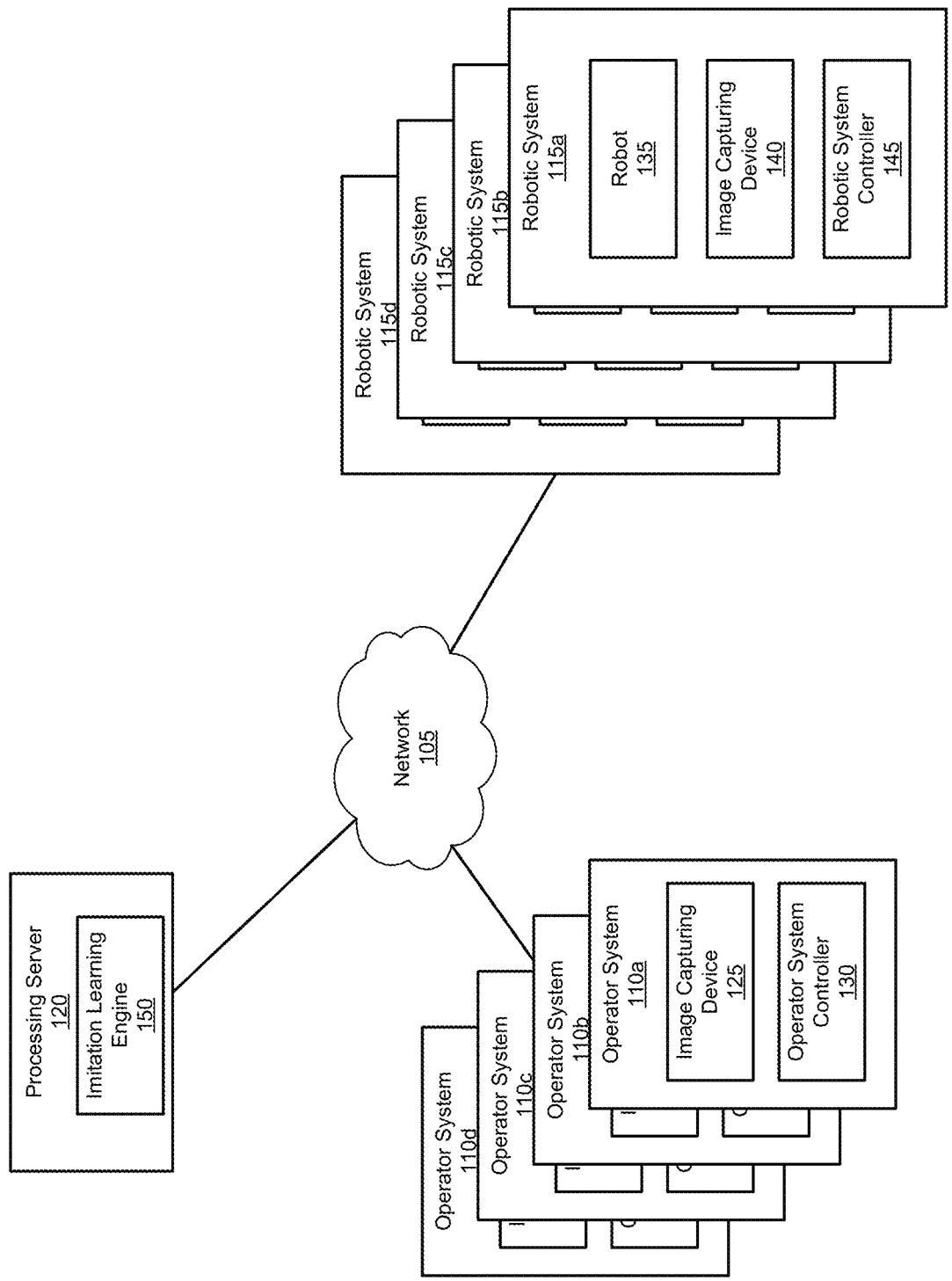
FIG. 1 illustrates a block diagram of a system for teleoperation of robotic systems, according to an embodiment.

The figures depict embodiments of the present disclosure for purposes of illustration only. Alternative embodiments of the structures and methods illustrated herein may be employed without departing from the principles, or benefits touted, of the disclosure described herein.

DETAILED DESCRIPTION

Embodiments relate to allowing an operator to wirelessly and intuitively control the joint space and/or end-effector space of a remotely located robot by simply moving one's hands, arms, legs, etc. without the need for traditional external calibrated motion capture systems, worn exoskeletons/sensors, or traditional but unintuitive joysticks. In a crowd-sourced teleoperation application, tasks that robots are currently unable to accomplish autonomously can be executed semi-autonomously via human teleoperation while the recorded data of how the human operator guided the robot to accomplish the arbitrary task can be used as training examples to use to enable robots to learn how to accomplish similar tasks in the future.

One embodiment for a method of teleoperating a robot based on a pose of a subject includes two major steps: (i) generating body pose information of the subject in a captured image, and (ii) generating a plurality of kinematic parameters of the robot based on the generated body pose information of the subject in the captured image. In the step of generating body pose information, an algorithm is used to localize an array of body parts of the subject in the captured image. The algorithm then projects the localized body parts of the subject onto a three-dimensional (3D) skeleton model of the subject. The 3D skeleton model is output as an estimate of the pose and is used for estimating and tracking the poses of the subject in a next captured image. In the step of generating the plurality of kinematic parameters, the 3D skeleton model is then mapped, directly or indirectly, to a configuration of the robot to determine a plurality of joint angles of the robot that correspond to the position and/or orientation of the subject's pose.

A subject herein refers to any moving objects that have more than one pose. The moving objects include, among other objects, animals, people, and robots. Although embodiments herein are described with reference to humans as the subject, note that the present invention can be applied essentially in the same manner to any other object or animal having more than one pose. In several instances, the subject may also be referred to as an operator.

The localized body parts herein refer to any portion of the subject that can be conceptually identified as one or more joints and links. For example, in a human subject, the localized body parts include, among other parts, a head, a torso, a left arm, a right arm, a left hand, a right hand, a left leg, and a right leg. The localized body parts can be subdivided into other parts (e.g., a left arm has a left upper arm and a left forearm, a left hand has a left thumb and left fingers). The one or more body parts may be localized relative to a camera, an external landmark, or another point on the subject's body. Note that the number of localized body parts is not limited and can be increased or decreased according to the purposes of the pose estimation and tracking. Body parts may also be referred to herein as limbs, segments, and links, and vice versa.

A model herein refers to a representation of the subject by joints and links. In one embodiment, the model is a human body represented as a hierarchy of and links with a skin mesh attached. Various models with joints and links can be used as the model of the subject. In alternative embodiments, the model is a subset of joints and links of the human body. For example, the model may be a hand that includes one or more of the following: a palm, a thumb, and a finger. For the sake of clarity, the skeleton model is referred to throughout, but it is understood that the skeleton model may not represent the full human body and instead may represent a portion of the human body.

FIG. 1 illustrates a block diagram of a system 100 for teleoperation of robotic systems 115a-115d, according to an embodiment. The system 100 includes, among other components, a network 105 that connects operator systems 110a-110d (collectively referred to as "operator systems 110" and also individually referred to as "operator system 110"), robotic systems 115a-115d (collectively referred to as "robotic systems 115" and also individually referred to as "robotic system 115"), and a processing server 120. In the embodiment of FIG. 1, four operator systems 110a, 110b, 110c, 110d and four corresponding robotic systems 115a, 115b, 115c, 115d are illustrated, but it is understood that the number of each system is not limited and can be increased or decreased. Some embodiments of the system 100 have different components than those described here. Similarly, in some cases, functions can be distributed among the components in a different manner than is described here.

The network 105 provides a communication infrastructure between the operator systems 110, the robotic systems 115, and the processing server 120. The network 105 is typically the Internet, but may be any network, including but not limited to a Local Area Network (LAN), a Metropolitan Area Network (MAN), a Wide Area Network (WAN), a mobile wired or wireless network, a private network, or a virtual private network. The network 105 enables users in different locations to teleoperate robots of robotic systems, for example, for the purposes of robotic labor.

The operator system 110 enables an operator to teleoperate one or more corresponding robotic systems 115. The operator system 110 may be located at a distance from its corresponding one or more robotic systems 115. In the embodiment of FIG. 1, the operator system 110 is controlled by the operator, who may be the subject of one or more captured images. For the sake of clarity, it is understood that the subject and the operator are referred to interchangeably, but it is also understood that, in some embodiments, the subject in the captured images may be a separate subject from the operator of the operator system 110. Generally, the operator takes one or more poses, and a robot mimics a processed mapping of the poses. The operator may take a specific series of continuous or non-continuous poses that causes the robot to accomplish a certain task. As the operator takes the one or more poses, the operator system 110 captures images of the subject and generates body pose information of the subject in the captured images. The generated body pose information is a representation of the pose of the subject in the captured images, which dictates a pose that a robot of a corresponding robotic system 115 takes. The operator system 110 then transmits the generated body pose information to the corresponding robotic system 115 via the network 105. In the embodiment of FIG. 1, the operator system 110a corresponds to robotic system 115a, the operator system 110b corresponds to robotic system 115b, the operator system 110c corresponds to robotic system 115c, and the operator system 110d corresponds to robotic system 115d. In alternative embodiments, one operator system 110 may correspond to two or more robotic systems 115. In the embodiment of FIG. 1, the operator system 110 includes an image capturing device 125 and an operator system controller 130.

The image capturing device 125 captures images and/or video of the subject whose pose is to be mapped to a robot of a corresponding robotic system 115. The image capturing device 125 may comprise one or more cameras positioned and/or oriented to capture part or all of the subject's body. The image capturing device 125 may be positioned on the subject's body and oriented such that segments of the subject's body are within a field of view of the image capturing device 125. Alternatively, the image capturing device 125 may be positioned external to the subject's body such that all or portions of the subject's body are within the field of view of the image capturing device 125. For example, the image capturing device 125 may be part of a camera assembly, an external mobile device, a virtual reality (VR) or augmented reality (AR) headset, a standalone VR or AR camera assembly, a similar portable imaging device, or some combination thereof. The field of view of the image capturing device 125 may vary to capture more or less of the subject's body. For example, the image capturing device 125 may comprise standard lenses or wide angle lenses (e.g., a fisheye lens). The image capturing device 125 may capture two-dimensional (2D) images. In alternative embodiments, the image capturing device 125 may comprise one or more depth cameras or cameras in stereo to capture images with depth information. The image capturing device 125 may capture images of the operator at a random or specified interval. In some embodiments, the operator may take a series of poses that cause the robot to accomplish a task. The image capturing device 125 may capture images as it detects movement of the operator. In some embodiments, the image capturing device 125 sends the captured images to the operator system controller 130. In alternative embodiments, the image capturing device 125 is integrated with the operator system controller 130.

In some embodiments, the image capturing device 125 captures images/and or video of equipment that is worn or manipulated by an operator. For example, the operator may be wearing a glove or holding a wand or a controller that includes visual markers. The image capturing device 125 may detect and capture a pose or motion of the visual markers, which can then be mapped to the robot of the corresponding robotic system 115. This configuration may be beneficial for robots including an end-effector or an instrument that resembles the glove or wand/controller manipulated by the operator. In some embodiments, the wand/controller may include buttons or switches as additional input for robot control, which may improve intuitive control and/or efficiency of the operator.

The operator system controller 130 generates body pose information of the subject in the captured image. The generated body pose information indicates a pose of the subject in the captured image. The operator system controller 130 may be a desktop, a laptop, a mobile device, or a similar computing device. In the embodiment of FIG. 1, the operator system controller 130 receives the captured images from the image capturing device 125. The operator system controller 130 may execute an algorithm that localizes an array of body parts of the subject in the captured image. The algorithm then projects the localized body parts of the subject onto a three-dimensional (3D) skeleton model of the subject. The 3D skeleton model is output as the estimate of the pose and is used for estimating and tracking the poses of the subject in a next captured image. Alternatively, the operator system controller 13 may execute an algorithm that directly predicts an estimate of the pose of the subject. The operator system controller 130 transmits the body pose information of the subject to the corresponding robotic system 115.

The operator system controller 130 may transmit additional teleoperation data to one or more corresponding robotic systems 115. The teleoperation data may be parameters associated with each captured image and/or processed image that are transmitted throughout teleoperation or may be calibration parameters that are transmitted before or during initial stages of teleoperation. In some embodiments, the parameters may be manually set by an operator (e.g., via a user interface), automatically determined by the operator system 110 or robotic system 115, and/or could be updated throughout teleoperation. The teleoperation data may be transmitted as a set of one or more parameters. Parameters may relate to motion scaling or sensitivity, pause functionality, origin reset, Cartesian or joint axis locking and unlocking, bounding volumes, 'home' positions and orientations, quick-snap orientations and positions and other similar features. Pause functionality enables the teleoperator to perform a gesture or use a specific pose that, when detected by the image capturing device 125, pauses motion and/or operation of the robot arm, which effectively pauses tracking between the teleoperator pose and the robot arm. A counter-gesture or counter-pose may be performed by the teleoperator to resume motion and/or operation of the robot arm. This feature may be used by the teleoperator to change or adjust their position, for example, to improve their comfort during teleoperation. Origin reset enables the teleoperator to modify the reference point to which the robot's motion or pose is relative. In one embodiment, this enables the teleoperator to keep the robot's motion within a comfortable range of human arm motion. Motion scaling enables motion from the operator to be mapped to motion of the robot on a different scale. For example, certain precise tasks performed by the robot may include small-scale motion (e.g., sub-millimeter motion) while the operator may move on a relatively larger scale (e.g., a centimeter scale); by scaling the motion of the operator, a robot may then move on a relatively smaller scale (e.g., a micron scale). As another example, a large robot may perform large motions; motion of the operator may occur on a relatively smaller scale (e.g., the centimeter scale), which may be scaled to correspond to motion of the robot on a relatively larger scale (e.g., a meter scale). Motion scaling may be applied linearly or non-linearly to individual axes in Cartesian space or joint space. Cartesian or joint-axis locking enables an operator to constrain the motion of a robot to a plane, a line, or point in 3D space. It may also be used to lock orientation of one or more segments and/or end-effectors of the robot along one or more axes. Bounding volumes may constrain a robot to only move within a certain subspace of its total workspace. Quick-snap orientations or positions may enable the robot to take a predefined pose or a pose calculated based on a vision system of the robot. If the vision system of the robot identifies a target object in the environment, the operator system controller 130 may suggest a pose based on the target object to the teleoperator who can then select for the robot to snap to the suggested pose. These features may be used in any combination and may apply to the entire robot or a portion of the robot (e.g., one or more segments and/or end-effectors). The operator system controller 130 is discussed in further detail with regards to FIG. 2.

The robotic system 115 controls the robot and causes the robot to move in accordance with a pose of the operator. The robotic system 115 receives the generated body pose information of the subject in the captured images and, based on the generated body pose information, determines mapping parameters and one or more kinematic parameters of the robot. In the embodiment of FIG. 1, the robotic system 115 includes a robot 135, an image capturing device 140, and a robotic system controller 145.

The robot 135 is a machine comprising one or more segments and one or more joints that are designed to manipulate, ambulate, or both in the case of mobile manipulation. The robot 135 may have an anthropomorphic design (having a human morphology) or similarly dimensioned segments resembling a human operator. For example, the robot 135 may have segments and joints that resemble body parts (e.g., limbs such as an arm, a leg, etc.) of the human operator and are designed to ambulate in a similar way. In some embodiments, the robot 135 may have an end-effector that resembles a human hand (e.g., having several fingers, joints, and degrees of freedom) or that functions similar to a hand (e.g., a claw, a 3-finger gripper, an adaptive gripper, an internal or external gripper, etc.). In other embodiments, the robot may not have an anthropomorphic design, where the robot's joints and segments do not closely align to joints and segments on the human operator's body. Generally, the robot 135 may have one or more ambulating segments (achieving mobility via wheels, legs, wheeled legs, or similar methods), a stationary arm with an end-effector, a combination of one or more ambulating segments and an end-effector, or some combination thereof. To move the robot 135, each joint may have one or more actuators.

In some embodiments, the robot 135 may include a gripper at the end-effector. The robot end-effector is gripper agnostic and can be used with several existing or custom grippers with varying number of degrees of freedom. The robot or robot arm may be equipped with a mobile base for locomoting around its environment using wheels, tracks, legs, or a multi-modal design incorporating legs with wheels or treads or any combination thereof. The teleoperation interface is robot agnostic and need not be paired with any particular robot arm to work as intended.

The image capturing device 140 captures images and/or video of the robot 135 and a local area surrounding the robot 135. The local area is the environment that surrounds the robot 135. For example, the local area may be a room that the robot 135 is inside. The image capturing device 140 captures images of the local area to identify objects that are near the robot 135. Identifying nearby objects enables the robotic system 115 to determine if there are any objects the robot will interact with to perform a task or if there are any constraints to the range of motion of the robot 135. For example, the robot 135 may be located in a small room near one or more walls, near one or more other robots, or other similar objects that the robot 135 aims to avoid during ambulation or manipulation. This enables safe use of the robot 135, especially if the robot 135 is in the presence of humans. The image capturing device 140 may capture images at a random, continuous, or specified interval to determine changes in the environment and subsequently update any constraints that need to be placed on the range of motion of the robot 135. The image capturing device 140 may be positioned and/or oriented to capture all or a portion of the robot 135 and its environment. Embodiments in which the image capturing device 140 comprises one or more cameras, the cameras may be located or mounted directly on varying parts of the robot or can be external to the robot. Similar to the image capturing device 125, the image capturing device 135 may be part of an imaging assembly, an external mobile device, a virtual reality headset, a stand-alone virtual reality camera assembly, a similar portable imaging device, a computer webcam, dedicated high-resolution camera(s), or some combination thereof. The field of view of the image capturing device 135 may vary to capture more or less of the robot 135. For example, the image capturing device 135 may comprise standard lenses or wide angle lenses (e.g., a fisheye lens). The image capturing device 135 may capture two-dimensional images. In alternative embodiments, the image capturing device 135 may comprise one or more depth cameras or cameras in stereo to capture images with depth information.

The robotic system controller 145 receives the generated body pose information from its corresponding operator system 110 and accordingly determines a set of mapping parameters and kinematic parameters to control the motion of the robot 135. As previously described, the body pose information may be in the form of a 3D skeleton model of the subject based on a pose of the subject in one or more captured images. The robotic system controller 115 maps the 3D skeleton model to the configuration of the robot 135. The robotic system controller 145 may have one or more control modes for mapping the arm and/or leg poses and joint angles to segments and joint angles of the robot 135. For example, a first control mode may be a direct mapping if the robot 135 has an anthropomorphic design or similarly dimensioned arms and/or legs to the operator. A second control mode may be an indirect mapping if the robot 135 does not have an anthropomorphic design. As such, the robotic system controller 145 is able to map an operator pose to a robot with any type of configuration. By mapping the 3D skeleton model to the configuration of the robot 135, the robotic system controller 145 determines one or more kinematic parameters for the robot 135. These kinematic parameters may include x-, y-, and z-coordinates; roll, pitch, and yaw; and joint angles for each segment and joint of the robot 135. The workspace coordinates of the robot 135 may be selected or pre-determined. The robotic system controller 145 may also receive and process force and/or haptic feedback from sensors on the robot 135; the robotic system controller 145 may transmit the force and/or haptic feedback to the operator system 110, which enables the operator to feel forces that the robot 135 is sensing as it moves and interacts with its environment. In an alternative embodiment, the force and/or haptic feedback from the robot 135 may be conveyed to the operator by visual or audible modalities, for example, in the form of augmented reality features on the operator system 110. The robotic system controller 145 may be a desktop, a laptop, a mobile device, or a similar computing device. The robotic system controller 145 is discussed in further detail with regards to FIG. 3.

The processing server 120 enables users to operate the operator systems 110 and robotic systems 115 via the network 105. The processing server 120 may be embodied in a single server or multiple servers. Further, each server may be located at different geographic locations to serve users of the operator system 110 or the robotic system 115 in different geographic locations. In the embodiment of FIG. 1, the processing server 120 may host the platform that allows users of the operator system 110 and the robotic system 115 to access and control each system without needing to install or download the platform onto their own devices.

In addition, the processing server 120 processes the data collected from the operator systems 110 and robotic systems 115. The processing server 120 executes a machine learning algorithm that learns from examples of robots being teleoperated to accomplish a variety of tasks in various environments and applications. In an example application, the system 100 may be used as a control input to crowdsourcing teleoperation of robotic labor. Because crowdsourcing leverages the network effect, the teleoperative nature of the system 100 enables the creation of a large data set of diverse demonstration tasks in diverse environments (which does not currently exist and is difficult/expensive to generate). In this configuration, the system 100 enables the use of powerful tools such as crowdsourcing data collection and deep imitation learning and meta-learning algorithms (which requires large amounts of data) to teach a robot to accomplish certain tasks. This learning process becomes possible when a robot is exposed to thousands of examples of how to properly (and not properly) accomplish a task. In the embodiment of FIG. 1, the processing server 120 includes the imitation learning engine 150.

The imitation learning engine 150 implements an algorithm to learn how a robot can perform different tasks based on the examples from human operators. The imitation learning engine 150 inputs into its model the data consisting of thousands of examples of robots executing a pose or performing a task based on the subject performing the tasks through teleoperation. A few examples of specific algorithms that may be employed are neural networks, imitation learning, meta-learning, deep multi-modal embedding, deep reinforcement learning, and other similar learning algorithms. The imitation learning engine 150 learns and extracts representations from these examples to determine appropriate movements for the robot to perform similar and unseen tasks in the same or different environments as provided in the demonstration training dataset. Accordingly, the imitation learning engine 150 stores a "label" corresponding to each task that includes the determined appropriate movements for each task. The imitation learning engine 150 can exist locally on the robotic system controller of a robot, on the operator system controller of an operator, or in the cloud running on a cloud server. In any embodiment, the data collected from each robot-teleoperator pair can be shared collectively in a database that enables data sharing for parallelized learning such that a first robot in a first environment performs a task, and, once the task is learned by the imitation learning engine 150, a second robot in a second environment may also learn the motions to perform the same task (as well as a third robot in a third environment, a fourth robot in a fourth environment, and so on, until an Nth robot in an Nth environment).

Figure 2:
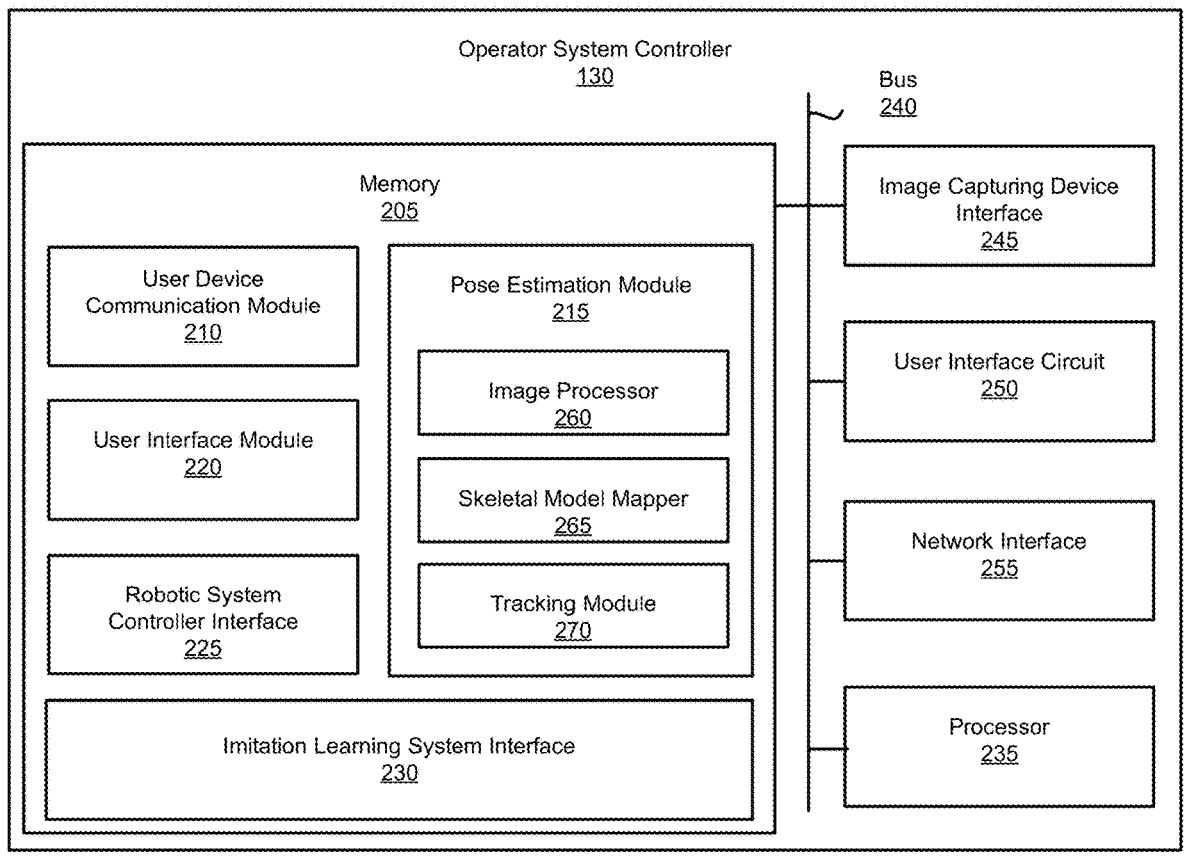
FIG. 2 illustrates a block diagram of an operator system controller, according to one embodiment.

FIG. 2 illustrates a block diagram of the operator system controller 130, according to one embodiment. As described with regards to FIG. 1, the operator system controller 130 generates body pose information of a subject in a captured image. The operator system controller 130 may be a desktop, a laptop, a mobile device, or a similar computing device. One or more of the components in the operator system controller 130 may be embodied as software that may be stored in a computer-readable storage medium, such as memory 205. In the embodiment of FIG. 2, the memory 205 stores, among others, a user device communication module 210, a pose estimation module 215, a user interface module 220, a robotic system controller interface 225, and an imitation learning system interface 230. Instructions of the software modules are retrieved and executed by a processor 235. The computer-readable storage medium for storing the software modules may be volatile memory such as RAM, non-volatile memory such as a flash memory or a combination thereof. A bus 240 couples the memory 205 and the processor 235. The bus 240 additionally couples the memory 205 to an image capturing device interface 245, a user interface circuit 250, and a network interface 255. Some embodiments of the operator system controller 130 have different components than those described here. Similarly, in some cases, functions can be distributed among the components in a different manner than is described here.

The user device communication module 210 is software, firmware, or a combination thereof for communicating with user devices via the network 105. A user device may be a device that an operator uses as part of the operator system 110. For example, a user device may be a mobile computing device, and the operator system controller 130 may be a desktop or a laptop that communicates with the user device. The user device communication module 210 receives commands and requests from the user device to access and control the operator system 110.

The pose estimation module 215 estimates a body pose of a subject in a captured image. In the embodiment of FIG. 2, the pose estimation module 215 may include, among others, an image processor 260, a skeletal model mapper 265, and a tracking module 270 as described below in detail.

The image processor 260 receives and processes the images captured by the image capturing device 125. The image processor 260 identifies a subject and the subject's body parts in a captured image. For example, the image processor 260 identifies hands, fingers, arms, elbows, shoulders, legs, knees, a head, etc. of the subject. The image processor 260 may use a machine learning model (e.g., a pre-trained deep learning model or convolutional neural network) to identify these body parts in each captured image. Additionally, the machine learning model localizes body parts and the dimensions between adjacent body parts or joints. Embodiments in which the captured images are without depth information, the localized body parts are two-dimensional characteristics of the pose of the subject. The machine learning model may use spatial motion information from an IMU on the mobile device from the relationship between a changing image perspective and the 6-axis motion of the image capturing device 125 (in an embodiment in which the image capturing device and the IMU are embedded in the same device and do not move relative to one another). In alternative embodiments, the operator may manually set the subject's body part dimensions. In some embodiments, the machine learning model may track certain body parts, joints, or segments relative to other body joints, parts, or segments, relative to an external landmark, or relative to the image capturing device 140.

The skeletal model mapper 265 projects the two-dimensional localized body parts to a three-dimensional skeleton model of the operator. In the embodiment of FIG. 2, the skeletal model mapper 265 executes an algorithm that enhances the alignment between a 2D pixel location of each body part in the captured image and the 3D skeleton model. The 3D skeleton model of the operator may be calibrated for operators of different sizes. In the embodiment of FIG. 2, the 3D skeleton model may include several parameters, such as body part dimensions (e.g., limb lengths), joint angles between adjacent body parts (e.g., limbs), and other relevant pose information. An output of the 3D skeleton model may be estimated pose information, which may include x-, y-, and z-coordinate positions with respect to a coordinate system (i.e., workspace) of each body part of the operator; roll, pitch, and yaw of the one or more body parts of the operator; and joint angles between adjacent body parts. In some embodiments, the skeletal model mapper 265 creates the 3D skeleton model during a calibration process, where the 3D skeleton model represents an initial estimated pose of the operator. The 3D skeleton model may receive as input the two-dimensional localized body parts from subsequent captured images of the subject and may output pose information for the pose of the subject in the subsequent captured images. In this configuration, the 3D skeleton model can be used to estimate and track poses of the subject based on subsequent captured images of the subject.

The tracking module 270 tracks the poses of the subject in subsequent images captured by the image capturing device 125. The tracking module 270 receives one or more processed images from the image processor 260, and uses it to estimate pose information of the subject in the processed images. In some embodiments, the one or more processed images may be images that were captured subsequent to the captured images used to generate the 3D skeleton model. In this configuration, the pose estimation module 215 is able to estimate a pose of a subject in real-time as images are captured by the image capturing device 125. The pose estimation of the subject is transmitted to the corresponding robotic system controller 145. This enables a robot of a corresponding robotic system to take a pose in accordance with the subject in real-time.

In alternative embodiments, the pose estimation module 215 may directly input one or more captured images into a machine learning model. The machine learning model may then output an estimation of the pose of the subject in the captured images or may then output a prediction of a pose or a motion of the robot. In this configuration, the pose estimation module 215 does not separately localize body parts of the subject in the captured images and generate a corresponding 3D skeleton model.

The user interface module 220 may update a user interface that allows the user to interact with and control the operator system 110. In the embodiment of FIG. 2, the user interface module 220 may provide a graphical user interface (GUI) that displays the robot 135. The GUI may display the robot 135 in its current environment and/or a simulated model of the robot in a simulated environment. The GUI may include a manual controller that allows individual control of each of the robot's joint angles as well as the position and orientation of an end-effector of the robot 135. The GUI may additionally include a point-and-click function that enables the operator to select, via a mouse or a touchscreen on the user device, objects in the robot's environment. Based on the object in the environment and past experiences with similar objects, the system 100 may infer how the operator would like that object manipulated or handled by the robot. A simulation of that action may then be shown to the user via the user interface (e.g., mobile screen, monitor, AR/VR, etc.) before the robot executes the task. The GUI may include options for the user to approve or reject the simulated action. In this configuration, the operator ensures that the autonomy of completing the specified task is correct before allowing the robot to move. The GUI may include options to enable or disable modes that dictate the autonomy of the robot 135. For example, the operator system controller 130 or the corresponding robotic system controller 145 may store automated motions that have been pre-defined, programmed, or previously-learned. These modes may increase the speed and efficiency of the operator. Similarly, the GUI may provide suggestions to an operator that may further streamline teleoperation of the robot 135. Suggestions may include poses or "snap" poses for the robot 135 to take. These poses may be poses that pre-defined, programmed, or previously-learned poses. A "snap" pose may snap one or more segments and/or end-effectors of the robot 135 into a pose or to an object to perform a dexterous task. For example, learned graspable objects (e.g., door handles, writing instruments, utensils, etc.) may have corresponding snap poses that enable the robot 135 to grasp the object. In this configuration, the robot 135 may be able to manipulate objects quickly and minimize fine robot control by an operator.

In one embodiment, the user interface module 220 may present an image and/or video stream of the robot 135 in the GUI on a monitor, mobile device, a head set (AR, VR, and/or MR), or similar. The user interface module 220 may overlay onto the video stream a simulation of the robot 135 or a portion of the robot 135 (e.g., an end-effector of the robot 135). Using the GUI, an operator may be able to position and/or orient the robot 135 in 6D space. An operator may be able to add one or more set points that define a pose or motion of the robot 135. The set points may be ordered in a defined sequence. Each set point may be associated with one or more types that each indicate an action that the robot may take at the set point. The robot 135 may then move through the set points in the defined sequence. The user interface module 220 may provide a simulation of the defined sequence in the GUI as an overlay on the image and/or video stream of the robot 135. Example set point types may include contact, grasping, trajectory, or other similar actions, or some combination thereof. A contact set point may define that the robot 135 contacts an object, tool, or area within its environment. A grasping set point may define that the robot 135 grasp an object when it reaches the set point. A trajectory set point may be used as a waypoint in a trajectory to ensure that the robot 135 moves through a target trajectory, for example, to avoid collisions with itself and/or the environment. In this embodiment, the user interface module 220 may also provide one or more suggestions for snap poses that each correspond to a target pose. The user interface module 220 may also provide one or more snap regions that correspond to each snap pose. An operator may select a snap pose and, in some embodiments, a snap region. The GUI may provide a simulation of the robot 135 snapping to the pose. The operator may select to accept or reject the simulation. If the simulation is accepted, the user interface module 220 may add the snap pose as a set point.

The user interface module 220 may additionally communicate depth information of the robot 135 and its environment to the operator. In one embodiment, a VR headset may be used to project stereo images into each eye that were captured using a stereo image capturing device on the robot 135. In this configuration, the human brain perceives depth information as human eyes naturally do without a VR headset. In an alternative embodiment, the user interface module 220 may use a mobile device, a monitor, or a head set (AR, VR, and/or MR) to display a video stream from the image capturing device 140 of the robot 135 to the operator. In these embodiments, additional features may be added to enhance depth perception of a 3D world projected onto a 2D computer monitor or mobile device. A processed depth stream from a depth camera may be displayed in depth form or as a point cloud to the operator. Multiple videos may be displayed from the image capturing device 140 of the robot 135, which may include multiple cameras with different perspectives (top view, side view, isometric view, gripper camera view, etc.) of the robot 135. Augmented reality (AR) features may be overlaid in real-time onto the video stream from the image capturing device 140 of the robot 135 to enhance depth perception. Example AR features may include depth-based augmented reality boxes, lines, shapes, and highlighting; square grids that align with 3D features in the environment of the robot 135; real or augmented laser pointer projected from an end-effector of the robot 135 to objects in the environment of the robot 135 with a measured distance reading to that object; use of background, foreground, stripes, and masking to distinguish objects of interest from the background; use of chromostereopsis methods where glasses with different colored lenses and processed display videos may be used to create an illusion of depth; use of processed images via spatio-temporal blur and focus rendering; use of a homunculus control panel with one or more camera feeds; a simulated robot configuration rendered over a transformed perspective of the point cloud image; and/or one or more of the previously described features depth enhancing features. These features may be integrated into the user interface module 220 individually or in some combination thereof. The AR features may be generated using stereo or depth sensing cameras of the image capturing device 140.

The robotic system controller interface 225 couples the operator system controller 130 to the robotic system 115 via the network 105. The robotic system controller interface 225 may transmit data to the robotic system controller 145 and receive data from the robotic system controller 145. In the embodiment of FIG. 2, the robotic system controller interface 225 transmits the generated pose estimation of the subject and tracking information to the robotic system 115. In some embodiments, the robotic system controller interface 225 may transmit additional data, such as the images captured by the image capturing device 125 and/or commands or requests input by the user via the user device. The robotic system controller interface 225 may receive captured images of the robot 135 captured by the image capturing device 140 and haptic feedback from the robotic system controller 145. The robotic system controller interface 225 may transmit data in real-time or at specified or random intervals.

The imitation learning system interface 230 provides data from the operator system 110 to the imitation learning engine 150 online or offline. The imitation learning system interface 230 transmits data associated with a subject performing a task, such as the captured images, the 3D skeleton model, the pose tracking information, and/or other relevant information. The imitation learning system interface 230 may transmit this data in real-time or at specified or random intervals. This enables the imitation learning engine 150 to continually improve online in real-time in a parallelized framework with every additional teleoperational task completed, which enables the robots connected within the system 100 to become more capable of autonomously performing tasks and requires fewer human interventions.

The image capturing device interface 245 is software, firmware, hardware, or a combination thereof that couples the operator system controller 130 to the image capturing device 125. For example, the image capturing device interface 245 may be a USB cable that couples to the bus 240. In another embodiment, image capturing device interface 245 may enable a wireless connection to the image capturing device 125, e.g., via the network 105, Bluetooth, or a similar connection.

The user interface circuit 250 is software, firmware, hardware, or a combination thereof that couples the user interface to the operator system controller 130. For example, the user interface circuit 250 may couple a keyboard and/or a mouse to the operator system controller 130 via the bus 240. In another embodiment, the user interface circuit 250 may enable a touchscreen or monitor on a user device of the operator system 110.

The network interface 255 is a hardware component that couples the operator system controller 130 to the network 105. For example, the network interface 255 may be a network interface card, a network adapter, a LAN adapter, or a physical network interface that couples to the bus 240.

Figure 3:
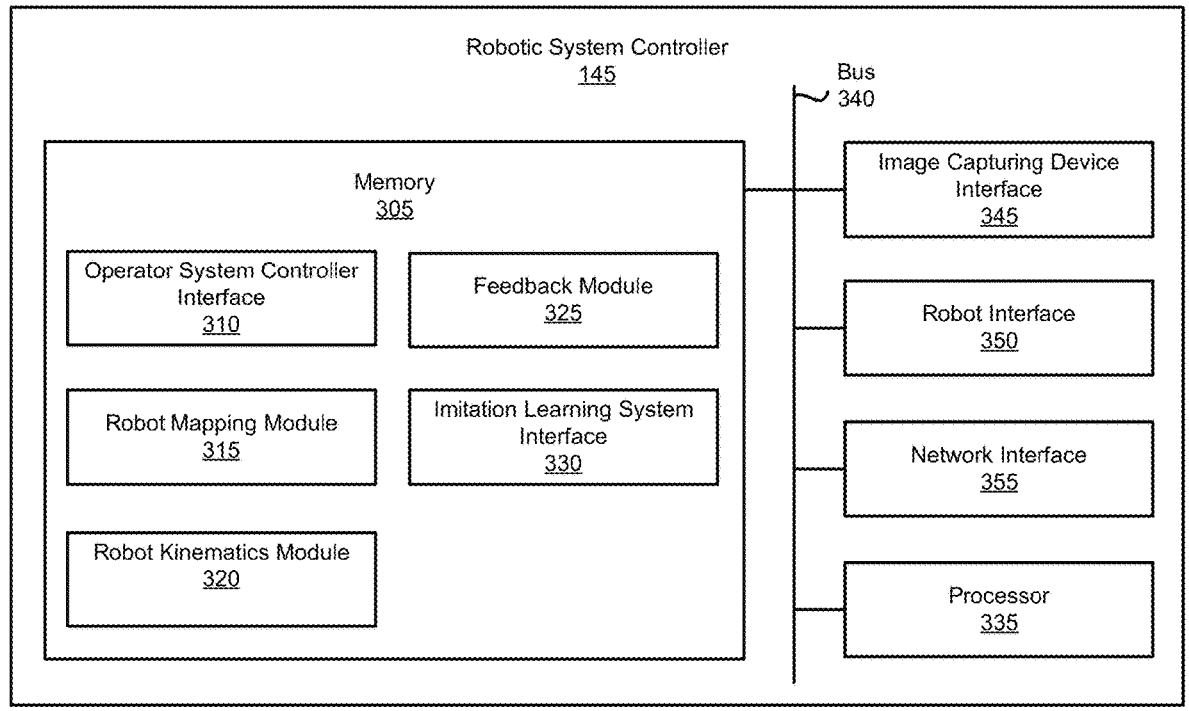
FIG. 3 illustrates a block diagram of a robotic system controller, according to one embodiment.

FIG. 3 illustrates a block diagram of a robotic system controller, according to one embodiment. As described with regards to FIG. 1, the robotic system controller 145 receives the generated body pose information from its corresponding operator system 110 and accordingly determines a set of kinematic parameters to move the robot 135. The robotic system controller 145 may be a desktop, a laptop, custom computer, a mobile device, or a similar computing device. The robotic system controller 145 includes components that are stored in a computer-readable storage medium, such as memory 305. In the embodiment of FIG. 3, the memory 305 stores an operator system controller interface 310, a robot mapping module 315, a robot kinematics module 320, a feedback module 325, and an imitation learning system interface 330. Instructions of the software modules are retrieved and executed by a processor 335. The computer-readable storage medium for storing the software modules may be volatile memory such as RAM, non-volatile memory such as a flash memory or a combination thereof. A bus 340 couples the memory 305 and the processor 335. The bus 340 additionally couples the memory 305 to an image capturing device interface 345, a robot interface 350, and a network interface 355. Some embodiments of the operator system controller 130 have different components than those described here. Similarly, in some cases, functions can be distributed among the components in a different manner than is described here.

The operator system controller interface 310 enables communication between the robotic system 115 and the operator system controller 130 via the network 105. The operator system controller interface 310 may transmit data to the operator system controller 130 and receive data from the operator system controller 130. In the embodiment of FIG. 3, the operator system controller interface 310 receives the generated pose estimation of the subject and tracking information from the operator system 110. The operator system controller interface 310 may transmit captured images of the robot 135 and its environment captured by the image capturing device 140 and feedback from the robot 135 including but not limited to force, torque, position, velocity, and other sensory feedback from the robot's joints, end-effector, segments, or externally in the robot's environment. In some embodiments, the operator system controller interface 310 transmits additional data, such as the configuration of the robot 135, current or previous states of the robot 135 including kinematic parameters for each state, information regarding the local area surrounding the robot 135, or some combination thereof. The operator system controller interface 310 may transmit data in real-time or at specified or random intervals.

The robot mapping module 315 maps the estimated pose of the operator to the configuration of the robot 135. In one embodiment, mapping the estimated pose to the robot 135 is performed by aligning and potentially scaling the limbs and joint angles of the operator to the segments and joint angles of the robot 135. The robot mapping module 315 may create a set of mapping parameters, which may include scaling coefficients, relationships of corresponding joints or segments, and other relevant information. In the embodiment of FIG. 3, the robot mapping module may have several control modes for mapping. For example, in a first control mode, direct mapping may be employed if the robot 135 has an anthropomorphic design or similarly dimensioned arms, legs, and/or fingers. Direct mapping maps the limbs and joint angles of the operator directly to the segments and joint angles of the robot 135. In this configuration, control of the robot 135 may be intuitive to the operator, especially if a virtual reality headset is used by the operator.

In a second control mode, indirect mapping may be employed if the robot 135 does not have an anthropomorphic design or similarly dimensioned arms, legs, and/or fingers. Indirect mapping may use a linear or non-linear function to map an estimate of the limbs and joint angles of the operator to the segments and joint angles of the robot 135. Indirect mapping may be used if 1) the robot's dimensions are on a different scale compared to the operator's body, 2) the robot has a different kinematic configuration or number of joints compared to the operator's body, or 3) it is desired to have varying levels of control sensitivity in joint or end-effector space.

In a third control mode, end-effector mapping may be employed if the robot 135 has an arm or leg that includes an end-effector where only the end-effector ambulates in accordance with the operator. End-effector mapping may track the poses of the operator's hand rather than the operator's limbs. The position and/or orientation of the fingers and/or the joint angles of the operator's hands are mapped to the position and/or orientation of the segments and/or joint angles of the end-effector. In this configuration, control of just the end-effector of the robot 135 may be intuitive when the robot 135 does not have an anthropomorphic design. In some embodiments, the arm or leg of the robot 135 may be stationary or may ambulate according to the first or second control mode.

The robot mapping module 315 may use one or control modes simultaneously for different portions of the robot 135.

In a fourth control mode, the operator's pose corresponds to a velocity or force controller rather than a position or pose tracker. In this embodiment, an origin position may be defined by the operator or automatically set to a default point in the operator's workspace. When the operator's hand (or other body part) is within a certain threshold distance from the origin, the robot 135 may not move. When the operator's hand is positioned at a distance greater than the threshold distance from the origin along one or more axes, the robot 135 may move at a velocity along an axis proportional to the distance the operator's hand is from the origin. To control robot orientation, the operator may use a user interface to toggle between position and orientation control. In one embodiment, a rotation vector connecting the origin to a point on the operator's body part (e.g., a palm center) and a norm of the rotation vector control a rotation axis and a proportional angular velocity about that rotation vector. Alternatively, a hand tracker may set thresholds relating to the operator's hand orientation such that when the hand orientation is within an angular threshold in roll, pitch, and yaw, the angular velocity of the robot 135 is zero. If the hand orientation exceeds those thresholds, the angular velocity of the robot 135 becomes proportional to an angular pose of the operator's hand relative to a coordinate frame at the origin. In this configuration, the operator may control the position and orientation of the one or more segments and/or end-effectors of robot 135 in velocity mode, allowing the operator to maintain his/her hand in a comfortable position. The pose of the operator may still be tracked, but in this embodiment, the relative position of the operator's hand relative to a defined origin maps to velocity of the robot 135 as opposed to the position of the operator's body mapping to the position of the robot 135. A user interface may display this functionality to operator control more intuitive. For example, the user interface may display a marker (e.g., a dot, simulated hand, or coordinate frame) that corresponds to the operator's hand position, which may have a coordinate frame overlaid onto it to illustrate the orientation of the operator's hand relative to a coordinate frame at the origin. The marker may be surrounded by a circle that defines the velocity threshold such that if the marker is within the circle, the robot 135 remains stationary in its current pose. If the marker is outside of the circle, then the robot 135 moves in the direction of the vector from the origin to the marker at a velocity proportional to a function of the norm of that vector.

In a fifth control mode, the operator may provide third person demonstrations that the robot mapping module 315 interprets such that the robot 135 performs higher level task-related motions. In this embodiment, the operator may manipulate an object in his/her environment, which the robot mapping module 315 maps to the robot manipulating a corresponding object (may or may not be the same object as the operator) in its environment in accordance with a processed version of the operators motion. The robot mapping module 315 may not map the exact poses or trajectory of the operator but rather may infer poses or a trajectory to achieve a similar high level task. For example, the operator may have a test object in his/her environment. The operator may specify an object in the environment of the robot 135 that corresponds to the test object. In some embodiments, the robotic system controller 145 may infer the object correspondence. The operator may manipulate the test object in some way, such as picking it up and placing it in a bin which will provide high level task information to the robotic system controller 145 that the robot 135 place the corresponding object in its environment in a bin. The objects in the operator's environment may not correspond identically with those in the environment of the robot 135. In the example described, the bins in the operator's environment and the robot's environment might be different sizes, shapes, colors, may appear differently, and may be placed in different locations relative to the test/corresponding object and/or operator/robot. In this control mode, the robot 135 may have a higher level of intelligence and may be trained on extracting higher level task-related information from the operator demonstration as opposed to fine motor control commands from the operator mapping explicitly to motion. This task-mapping mode may be used to manipulate objects in lower-level control mode such that however the operator manipulates the test object, the robot 135 manipulates the corresponding object in the same or similar (inferred) way.

The robot kinematics module 320 determines one or more kinematic parameters for the robot 135. In the embodiment of FIG. 3, the kinematic parameters correspond to a position and an orientation for each segment and/or joint of the robot 135. The kinematic parameters may include one or more of the following: a set of x-, y-, and z-coordinates with respect to the coordinate system (i.e., workspace) of the robot 135; roll, pitch, and yaw describing orientation of one or more segments of the robot 135; joint angles between adjacent segments; a set of transformation coefficients between the body of the operator and the configuration of the robot 135. The robot kinematics module 320 determines these kinematic parameters based on the mapping parameters from the robot mapping module 315 that maps the body pose of the operator to the configuration of the robot 135. The robot kinematics module 320 may send the kinematic parameters to the robot interface 350 for motion of the robot 135 in accordance with the kinematic parameters.

As the operator takes a series of poses that collectively cause the robot 135 to perform a task, the robot kinematics module 320 determines a set of kinematic parameters for each subsequent pose. For the subsequent poses that the robot 135 may take, the robot kinematics module 230 may consider an initial state of the robot 135 (e.g., current pose) and a target state of the robot 135 (corresponding to the pose of the subject) to determine a movement to transition the robot 135 from the current state to the target state. The robot kinematics module 320 may generate an intermediate set of parameters that represent the transitional movement (i.e., a motion trajectory). In the embodiment of FIG. 3, the robot kinematics module 320 may perform an optimization algorithm to determine the optimal transitional movement. The robot kinematics module 320 may consider any constraints placed on the robot 135, for example to prevent self-collision or collisions with objects in the local area of the robot 135 as determined from the image capturing device 140. In some embodiments, the operator system controller interface 310 sends the kinematic parameters and intermediate parameters to the operator system controller 130 such that a simulation of the movement is displayed in a user interface of the user device, enabling the operator to approve or reject the simulated movement before the robot 135 takes the pose.

The feedback module 325 receives and processes feedback from the robot 135. In the embodiments of FIGS. 1-3, the robot 135 may include sensors on each segment or at each joint, such as torque sensors, encoders, cameras, IMUs, and other possible sensors. The feedback module 325 may monitor the feedback from the sensors to ensure that the detected feedback stays within an acceptable range. For example, monitoring feedback from the torque sensors ensures that the segments and/or joints of the robot 135 do not experience excessive load-bearing forces. In some embodiments, the feedback module 325 may constrain a motion or a pose of the robot 135 if the feedback module 325 detects feedback that is outside of an acceptable range. In the embodiment of FIG. 3, the operator system controller interface 310 may transmit force or haptic feedback from the feedback module 325 to the operator system 110, which may enable the operator to feel forces that the robot 135 is sensing as it moves and interacts with its environment. In some embodiments, the operator system 110 may update a user interface of the user device to inform the operator of the feedback and if any detected feedback is outside of an acceptable range. The operator system 110 may provide multisensory feedback (e.g., visual or audio feedback) through, for example, AR or display features.

The imitation learning system interface 330 provides data from the robotic system 115 to the imitation learning engine 150. The imitation learning system interface 330 transmits data such as images captured by the image capturing device 140 of the robot 135 and its environment, images captured by the image capturing device 125 of the operator, mapping parameters, kinematic parameters, corresponding initial and target states and the associated intermediate parameters, sensor feedback, and other relevant information such as an embedding or information of the type of task being performed. Based on the tasks performed by the operator and the corresponding states and kinematic parameters of the robot 135, the imitation learning engine 150 learns and labels the poses for a robot to accomplish each task. The imitation learning system interface 330 may transmit this data in real-time or at specified or random intervals. This enables the imitation learning engine 150 to continually improve online in real-time, in a parallelized framework where the robotic systems 115 collectively learn from their own and other's demonstrations and experiences. With every additional teleoperational task completed, the robots become more capable of autonomously performing tasks and require fewer human interventions.

The image capturing device interface 345 is software, firmware, hardware, or a combination thereof that couples the operator system controller 130 to the image capturing device 140. For example, the image capturing device interface 345 may be a USB cable that couples to the bus 340. In another embodiment, image capturing device interface 345 may enable a wireless connection to the image capturing device 140, e.g., via the network 105, Bluetooth, or a similar connection.

The robot interface 350 may be software, firmware, hardware, or a combination thereof that couples the robotic system controller 145 to the robot 135. For example, the robot interface 350 may be a power cable, USB cable, or a similar connection. In alternative embodiments, the robot interface 350 may be a wireless connection via the network 105, Bluetooth, or a similar wireless connection. In the embodiment of FIG. 3, the robotic system controller 145 transmits the intermediate parameters and the kinematic parameters to one or more actuators at the respective joints of the robot 135. In this configuration, the actuators move the robot 135 in accordance with the parameters received. The robot 135 may additionally send sensor feedback to the robotic system controller 145 via the robot interface 350.

The network interface 355 is a hardware component that couples the robotic system controller 145 to the network 105. For example, the network interface 355 may be a network interface card, a network adapter, a LAN adapter, or a physical network interface that couples to the bus 340.

Figure 4:
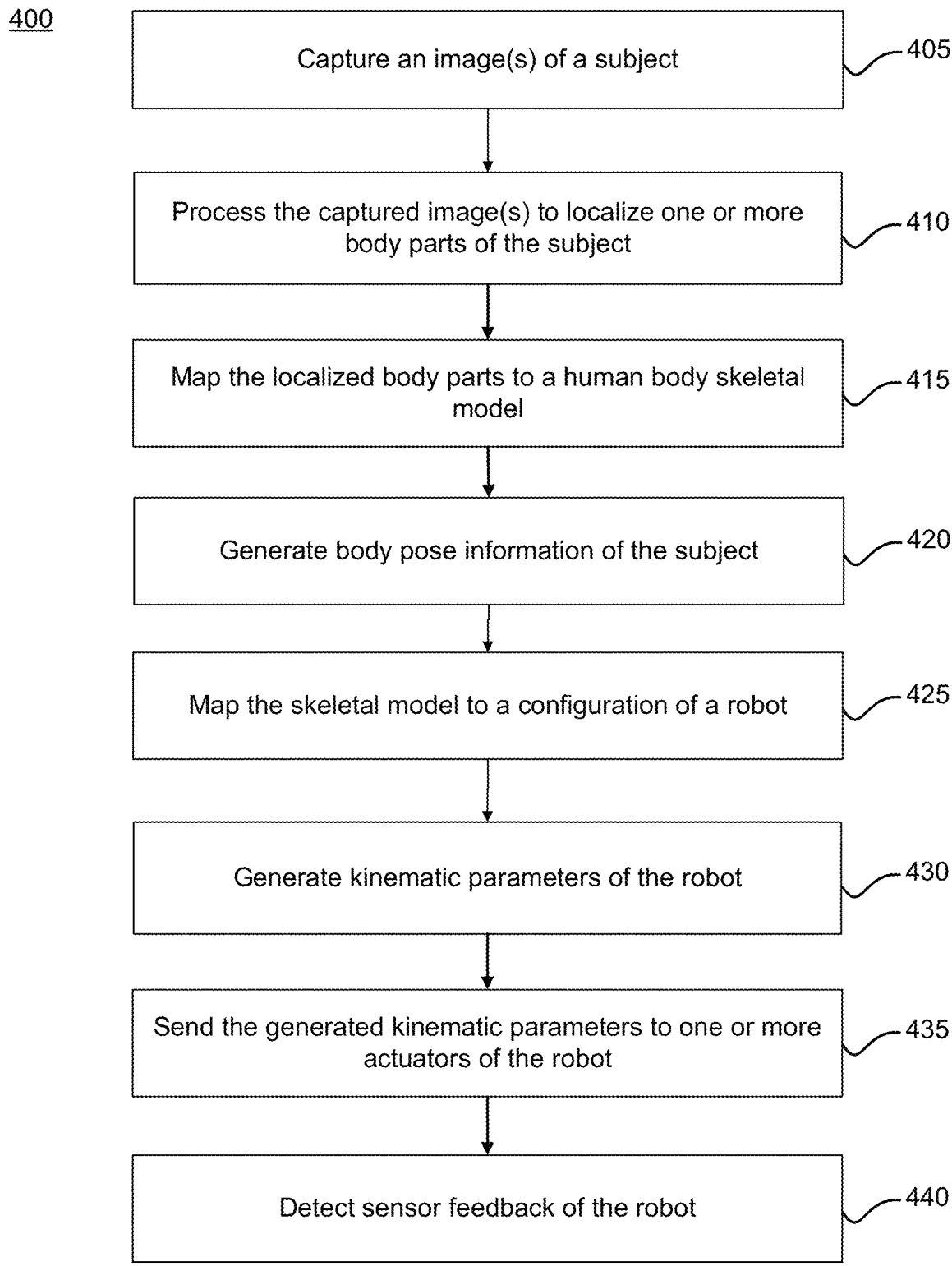
FIG. 4 illustrates a flowchart of a method for teleoperating a robot by mapping a pose of an operator, according to one embodiment.

FIG. 4 illustrates a flowchart of a method 400 for teleoperating a robot by mapping a pose of an operator, according to one embodiment. The method 400 can be performed using a computer system (e.g., system 100).

An image capturing device (e.g., image capturing device 125) captures 405 an image of a subject. The image capturing device may be part of an imaging assembly, an external mobile device, a virtual reality headset, a standalone virtual reality camera assembly, a webcam, a similar portable imaging device, or some combination thereof. The image capturing device may be positioned on the subject's body and oriented such that segments of the subject's body are within a field of view of the image capturing device, or the image capturing device may be positioned external to the subject's body such that all or portions of the subject's body are within the field of view of the image capturing device. In the embodiment of FIG. 4, the image capturing device captures images that are two-dimensional (i.e., without depth information). The image capturing device captures 405 images of the subject as the subject takes a series of poses, which are to be mapped to a robot of a robotic system, causing the robot to perform a task.

An image processor (e.g., image processor 260) processes 410 the captured image(s) to localize one or more body parts of the subject. The image processor identifies the subject and the subject's body parts in the captured image. For example, the image processor identifies hands, fingers, arms, elbows, shoulders, legs, knees, a head, etc. of the subject. The image processor may use a machine learning model (e.g., a pre-trained deep learning model or convolutional neural network) to identify these body parts in each captured image. Additionally, the machine learning model localizes body parts and the dimensions between adjacent body parts or joints.

A skeletal model mapper (e.g., skeletal model mapper 265) maps 415 the localized body parts to a human body skeletal model. The skeletal model mapper projects the two-dimensional localized body parts to a three-dimensional skeleton model of the operator. In the embodiment of FIG. 4, the skeletal model mapper executes an optimization algorithm that maximizes the alignment between a 2D pixel location of each body part in the captured image and the 3D skeleton model. The 3D skeleton model represents an initial estimated pose of the operator. In the embodiment of FIG. 4, the 3D skeleton model may include several parameters, such as body part dimensions (e.g., limb lengths), joint angles between adjacent body parts (e.g., limbs), and other relevant pose information.

A pose estimation module (e.g., pose estimation module 215) generates 420 body pose information of the subject. In some embodiments, the body pose information of the subject is generated based on the skeletal model. In alternative embodiments, a machine learning model estimates the body pose information based on the captured image(s) or a processed version of the captured image(s) of the subject. The machine learning model is used to estimate and track poses of the subject for subsequently received captured images of the subject.

A robot mapping module (e.g., robot mapping module 315) maps 425 the body pose estimates to a configuration of a robot (e.g., robot 135). The robot mapping module maps the body pose estimates of the operator to the configuration of the robot. The robot mapping module may create a set of mapping parameters, which may include scaling coefficients, relationships of corresponding joints or segments, and other relevant information. In the embodiment of FIG. 4, the robot mapping module may use one or more control modes (e.g., direct mapping, indirect mapping, end-effector mapping) for mapping.

A robot kinematics module (e.g., robot kinematics module 320) generates 430 kinematic parameters of the robot (e.g., robot 135). In the embodiment of FIG. 4, the kinematic parameters correspond to a position and an orientation for each segment and/or joint of the robot. The kinematic parameters may include one or more of the following: a set of x-, y-, and z-coordinates with respect to the coordinate system (i.e., workspace) of the robot 135; roll, pitch, and yaw of one or more segments of the robot; joint angles between adjacent segments; a set of transformation coefficients between the body of the operator and the configuration of the robot. The robot kinematics module determines these kinematic parameters based on the mapping parameters from the robot mapping module that maps the 3D skeleton model of the operator to the configuration of the robot.

A robotic system controller (e.g., robotic system controller 145) sends 435 the generated kinematic parameters to one or more actuators of the robot (e.g., robot 135). In accordance with the generated kinematic parameters, the actuators ambulate the one or more segments and joints to a target pose (corresponding to the pose of the subject).

A feedback module (e.g., feedback module 325) detects 440 sensor feedback of the robot (e.g., robot 135). The feedback module monitors the feedback from sensors on the robot to ensure that the detected feedback stays within an acceptable range. In some instances, the feedback module may constrain a motion or a pose of the robot if the feedback module detects feedback that is outside of an acceptable range.

Various modifications or changes may be made to the method 400 illustrated in FIG. 4. For example, steps 410, 415, and 440 may be omitted. Also, the sequence of steps 430, 435, and 440 may be modified.

Figure 5:
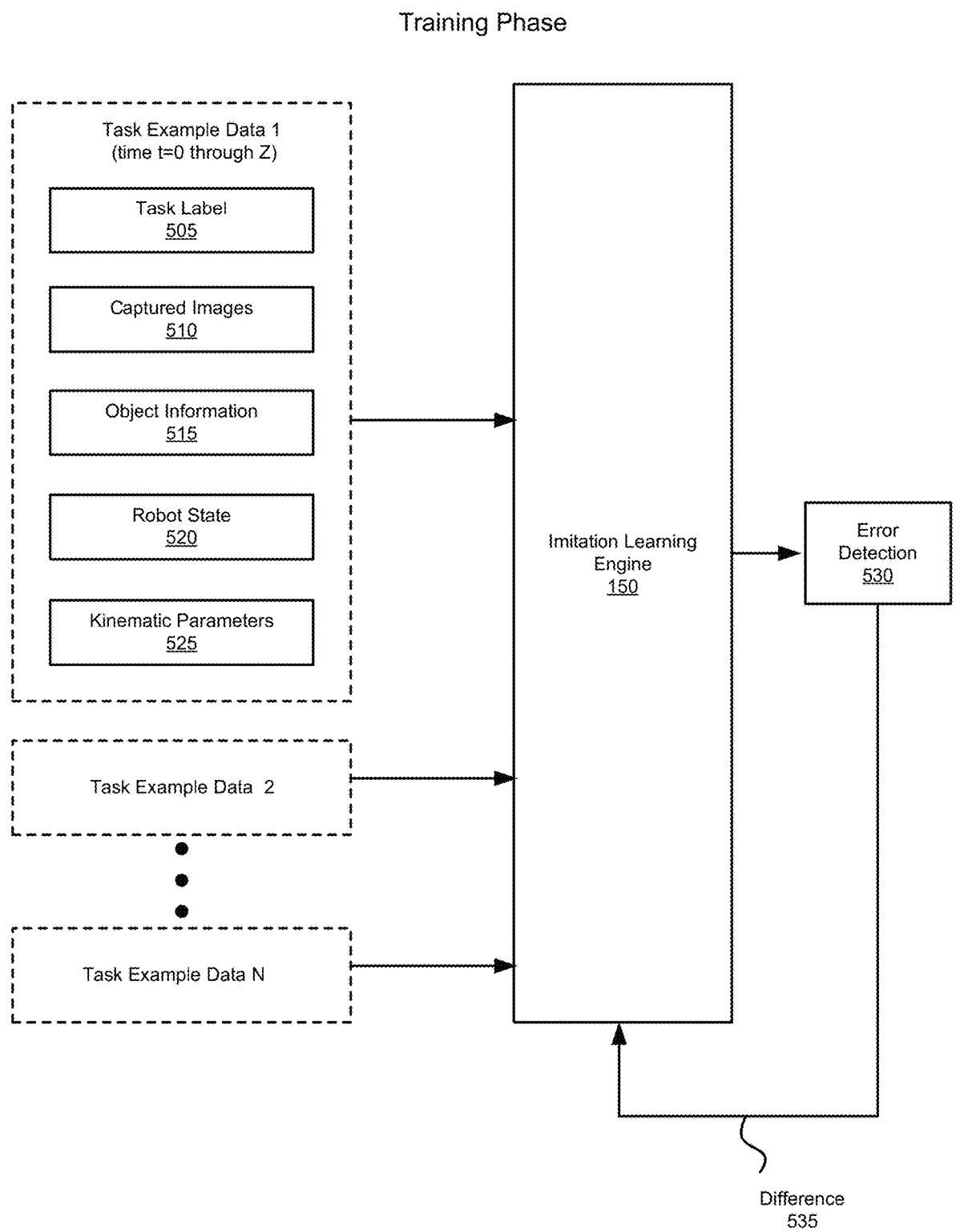
FIG. 5 illustrates a schematic block diagram of a training phase of an imitation learning engine, according to one embodiment.

FIG. 5 illustrates a schematic block diagram of a training phase of the imitation learning engine 150, according to one embodiment. During the training phase, the imitation learning engine 150 implements a learning algorithm to learn how a robot can perform different tasks based on example demonstrations from human operators. The imitation learning engine 150 inputs into its model a large number of examples of robots executing a pose or performing a task based on the subject performing the tasks. The imitation learning engine 150 learns using these examples to determine appropriate movements for the robot to perform the same tasks. Accordingly, the imitation learning engine 150 stores a "label" for each task that includes the determined appropriate movements for each task.

In the embodiment of FIG. 5, the imitation learning engine inputs data from several examples of a human operator teleoperating a robot to perform a task. Each example includes a series of poses by the subject and by the robot that occurred over a period of time, t=0 to t=Z, where Z indicates the amount of time to complete the task. As illustrated in FIG. 5, an example includes a task label 505 associated with the task performed by the robot, captured images 510, object information 515, a robot state 520 of the robot before taking a pose, and kinematic parameters 525 associated with each robot state 520. The task label 505 indicates the task performed by the robot. The captured images 510 are one or more images captured of the local area surrounding the robot. The object information 515 includes data regarding objects located in the local area surrounding the robot. The robot state 520 is an initial configuration of the robot before taking the pose corresponding to the pose of the subject. The kinematic parameters 525 are the kinematic parameters associated with the configuration of the robot taking the pose corresponding to the pose of the subject.

The imitation learning engine 150 receives as input the task label 505, the captured images 510, the object information 515, and the robot state 520 before each pose, and then, for each pose in the sequence of poses to complete the task, outputs a prediction of the kinematic parameters to achieve each pose or robot motion trajectory. The imitation learning engine 150 performs error detection 530 and compares the predicted kinematic parameters to the actual kinematic parameters for each pose or robot motion trajectory. Based on a calculated difference 535, the imitation learning engine 150 may adjust the coefficients of its machine learning model to reduce the detected error. The imitation learning engine 150 may perform the training process multiple times for one or more task examples that it receives.

Figure 6:
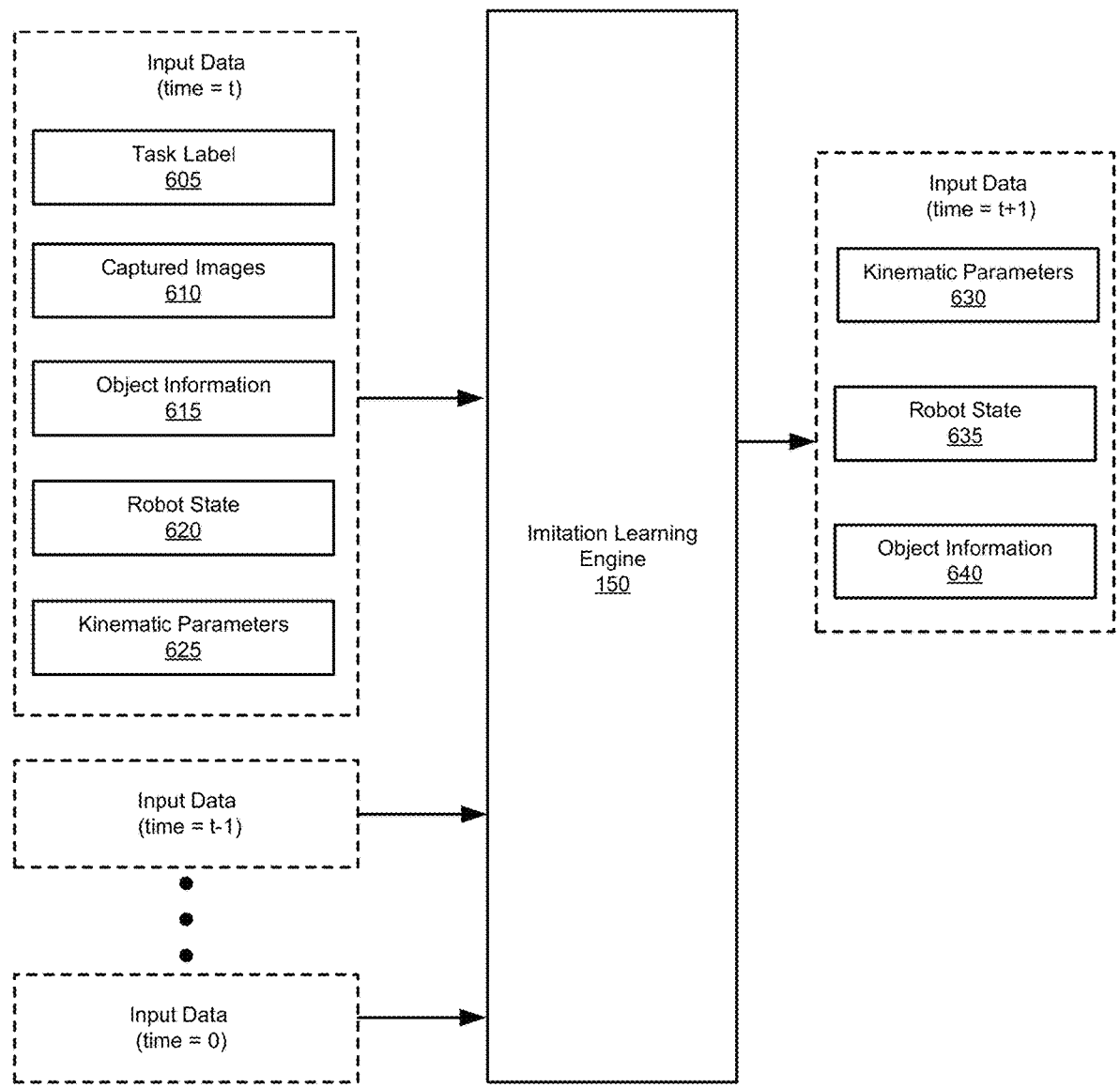
FIG. 6 illustrates a schematic block diagram of an operational phase of the imitation learning engine, according to one embodiment.

FIG. 6 illustrates a schematic block diagram of an operational phase of the imitation learning engine 150, according to one embodiment. During the operational phase, the imitation learning engine 150 determines the configuration of a robot at several time steps such that when executed in sequence enable the robot to perform a task. The imitation learning engine 150 analyzes a current configuration of a robot (e.g., at time=t) to determine a configuration of a robot at a next time step (e.g., time=t+1). The imitation learning engine 150 may be executed for one or more remotely located robots. As illustrated in FIG. 6, the input data associated with time=t includes a task label 605 associated with the task to be performed by the robot, captured images 610, object information 615, a robot state 620, and kinematic parameters 625. The task label 605 indicates the task to be performed by the robot. The captured images 610 are one or more images captured of the local area surrounding the robot. The object information 615 includes data regarding objects located in the local area surrounding the robot (e.g., objects that the robot will interact with or will avoid). The robot state 620 is the configuration of the robot (e.g., at a current time step, time=t). The kinematic parameters 625 are the kinematic parameters associated with the configuration of the robot (e.g., at a current time step, time=t).

Based on the input data, the imitation learning engine 150 may output kinematic parameters 630, a robot state 635, and object information 635 for the robot at the subsequent time step. These kinematic parameters 630 may include x-, y-, and z-coordinates; roll, pitch, and yaw; and joint angles for each segment and joint of the robot. The robot state 635 represents the subsequent configuration of the robot. The object information 635 may change from the previous time-step, for example, if the robot interacted with any objects in its environment or if the position or orientation of the robot changed with respect to the objects. The imitation learning engine 150 may perform this process for the next time step (e.g., time=t+2) using the kinematic parameters 630, the robot state 635, and the object information 640. The imitation learning engine 150 may repeat this process for each subsequent time step, enabling the robot to accomplish the task associated with the task label 605.

The foregoing description of the embodiments of the disclosure has been presented for the purpose of illustration; it is not intended to be exhaustive or to limit the disclosure to the precise forms disclosed. Many modifications and variations are possible in light of the above disclosure.

Some portions of this description describe the embodiments of the disclosure in terms of algorithms and symbolic representations of operations on information. These algorithmic descriptions and representations are used to convey the substance of the work effectively. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system comprising:
   an imitation learning engine;
   an operator system controller coupled to an image capturing device, the operator system controller configured to:
      process an image of a subject, captured by the image capturing device, using a machine learning algorithm to identify one or more body parts of the subject during execution of a task; and
      generate, based on the one or more body parts of the subject, body pose information of the subject in the captured image, the body pose information indicating a pose or motion trajectory of the subject in the captured image; and
   a robotic system controller communicating with the operator system controller over a network, the robotic system controller coupled to a second image capturing device, the robotic system controller configured to:
      receive one or more images of a robot and/or an environment surrounding the robot, captured by the second image capturing device, during execution of the task;
      generate one or more pose and/or motion commands by processing the body pose information received from the operator system controller;
      control one or more actuators of the robot according to the one or more pose and/or motion commands to cause the robot to take a pose or motion trajectory corresponding to the pose or motion trajectory of the subject in the captured image; and
      provide the one or more images of the robot and/or the environment surrounding the robot, the one or more pose and/or motion commands, and/or information identifying the task to the imitation learning engine.

2. The system of claim 1, wherein processing the image of the subject includes localizing the one or more body parts of the subject in the captured image.

3. The system of claim 1, wherein the operator system controller is further configured to:
   map at least one of the one or more body parts of the subject to a three-dimensional skeleton model of the subject, wherein the three-dimensional skeleton model of the subject is an intermediate mapping to estimate the pose of the subject in the captured image.

4. The system of claim 3, wherein the three-dimensional skeleton model of the subject includes, one or more of (i) three-dimensional coordinate positions of the one or more body parts of the subject with respect to a coordinate system of the subject, (ii) orientation of the one or more body parts of the subject, and (iii) one or more joint angles between a pair of adjacent body parts of the one or more body parts.

5. The system of claim 1, wherein the robotic system controller is further configured to process the body pose information based on a configuration of the robot by aligning the one or more body parts and/or joint angles of the subject to one or more segments and joints of the robot.

6. The system of claim 5, wherein the robotic system controller is configured to align the one or more body parts and joint angles of the subject to one or more segments and joints of the robot in accordance with direct mapping, indirect mapping, or end-effector mapping.

7. The system of claim 1, wherein the one or more pose and/or motion commands comprise one or more of (i) three dimensional coordinates, (ii) orientation, and (iii) joint angles for one or more segments and one or more joints of the robot.

8. The system of claim 1, wherein the operator system controller and the robotic system controller communicate via a network.

9. The system of claim 1, wherein, the robotic system controller is configured to:
   identify one or more objects in the one or more images of the robot and/or the environment surrounding the robot; and
   generate the one or more pose and/or motion commands based in part on an interaction between the robot and the one or more identified objects.

10. The system of claim 1, wherein the imitation learning engine is further configured to:
    receive identifications of a plurality of tasks and corresponding kinematic parameters that change over time to perform the plurality of tasks using a plurality of robots of different configurations at different locations; and train a machine learning algorithm using the received identification of the tasks and the kinematic parameters of the plurality of robots to predict a series of kinematic parameters for a predetermined robot to perform a selected task of the plurality of tasks.

11. The system of claim 10, wherein training the machine learning algorithm comprises:
calculating a difference between the predicted kinematic parameters and received kinematic parameters; and
adjusting, based on the difference, one or more coefficients of the machine learning algorithm to reduce the difference.

12. The system of claim 10, wherein the a plurality of tasks and corresponding kinematic parameters include the task and the plurality of kinematic parameters, respectively.

13. A method of operating a robot comprising:
by an operator system controller:
processing an image of a subject using a machine learning algorithm to identify one or more body parts of the subject during execution of a task;
generating, based on the one or more body parts of the subject, body pose information of the subject in the captured image, the body pose information indicating a pose or motion trajectory of the subject in the image; and
by a robotic system controller:
receiving one or more images of the robot and/or an environment surrounding the robot, captured by a second image capturing device, during execution of the task;
generating one or more pose and/or motion commands by processing the body pose information received from the operator system controller;
controlling one or more actuators of the robot according to the one or more pose and/or motion commands to cause the robot to take a pose or motion trajectory corresponding to the pose or motion trajectory of the subject in the image and
providing the one or more images of the robot and/or the environment surrounding the robot, the one or more pose and/or motion commands, and/or information identifying the task to the imitation learning engine.

14. The method of claim 13, wherein processing the image of the subject includes localizing the one or more body parts of the subject in the image.

15. The method of claim 13, further comprising:
by the operator system controller:
mapping the subject and at least one body part of the one or more body parts of the subject to a three-dimensional skeleton model of the subject, wherein the three-dimensional skeleton model of the subject is an intermediate mapping to estimate the pose of the subject in the image, and
wherein the three-dimensional skeleton model of the subject includes one or more of (i) three-dimensional coordinate positions of the one or more body parts of the subject with respect to a coordinate system of the subject, (ii) orientation of the one or more body parts of the robot, and (iii) one or more joint angles between a pair of adjacent body parts of the one or more body parts.

16. The method of claim 13, further comprising:
by the robotic system controller:
processing the generated body pose information based on a configuration of the robot by aligning the one or more body parts and joint angles of the subject to one or more segments and joints of the robot.

17. The method of claim 16, further comprising aligning the one or more body parts and joint angles of the subject to one or more segments and joints of the robot in accordance with one or more of the following control modes: direct mapping, indirect mapping, and end-effector mapping.

18. The method of claim 13, wherein the one or more pose and/or motion commands comprise one or more of (i) three-dimensional coordinates, (ii) orientation, and (iii) joint angles for one or more segments and one or more joints of the robot.

19. The method of claim 13, further comprising:
identifying one or more objects in the one or more images of the robot and/or the environment surrounding the robot; and
generating the one or more pose and/or motion commands based in part on an interaction between the robot and the one or more identified objects.

20. A non-transitory computer-readable storage medium storing instructions that, when executed by one or more processors, cause the one or more processors to perform operations comprising:
processing an image of a subject using a machine learning algorithm to identify one or more body parts of the subject during execution of a task;
generating, based on the identified one or more body parts of the subject, body pose information of the subject in the image, the body pose information indicating a pose or motion trajectory of the subject in the image;
receiving one or more images of a robot and/or an environment surrounding the robot during execution of the task;
generating one or more pose and/or motion commands by processing the body pose information;
controlling one or more actuators of the robot according to the one or more pose and/or motion commands to cause the robot to take a pose or motion trajectory corresponding to the pose or motion trajectory of the subject in the image; and
providing the one or more images of the robot and/or the environment surrounding the robot, the one or more pose and/or motion commands, and/or information identifying the task to an imitation learning engine.

21. The computer-readable storage medium of claim 20, wherein the instructions, when executed by the one or more processors, further cause the one or more processors to:
process the generated body pose information based on a configuration of the robot by aligning the one or more body parts and joint angles of the subject to one or more segments and joints of the robot.

22. The computer-readable storage medium of claim 21, wherein the instructions, when executed by the one or more processors, further cause the one or more processors to:
align the one or more body parts and joint angles of the subject to one or more segments and joints of the robot in accordance with one or more of the following control modes: direct mapping, indirect mapping, and end-effector mapping.

23. The computer-readable storage medium of claim 20, wherein the one or more pose and/or motion commands comprise one or more of the following: x-, y-, and z-coordinates; roll, pitch, and yaw; and joint angles for one or more segments and one or more joints of the robot.

24. The computer-readable storage medium of claim 20, wherein the instructions, when executed by the one or more processors, further cause the one or more processors to:

identify one or more objects in the one or more images the robot and/or the environment surrounding the robot; and generate the one or more pose and/or motion commands based in part on an interaction between the robot and the one or more identified objects.

25. A system comprising:

an imitation learning engine an operator system controller coupled to an image capturing device, the operator system controller configured to:
  generate body pose information of a subject captured in an image by the image capturing device, the body pose information indicating a pose or motion trajectory of the subject in the captured image; and a robotic system controller communicating with the operator system controller over a network, the robotic system controller configured to:
  generate one or more pose and/or motion commands by processing the body pose information received from the operator system controller;
  control one or more actuators of the robot according to the one or more pose and/or motion commands to cause the robot to take a pose or motion trajectory corresponding to the pose or motion trajectory of the subject in the captured image; and
  provide the one or more pose and/or motion commands to the imitation learning engine.

* * * * *